United States Patent [19]
Bloom

[11] Patent Number: 5,902,224
[45] Date of Patent: May 11, 1999

[54] MASS-MASS CELL GAS CENTRIFUGE

[75] Inventor: Michael R. Bloom, Kasota, Minn.

[73] Assignee: Fuge Systems, Inc., Plano, Tex.

[21] Appl. No.: 08/819,583

[22] Filed: Mar. 14, 1997

[51] Int. Cl.⁶ .............................. B04B 5/08; B04B 5/12; B04B 11/00
[52] U.S. Cl. .............................. 494/25; 494/27; 494/68; 494/900; 55/257.4; 55/407; 95/218
[58] Field of Search .............................. 494/22, 23, 25, 494/26, 27, 28, 29, 30, 37, 43, 60, 67, 68, 69, 85, 900; 95/218; 261/89; 55/257.4, 407

[56] References Cited

U.S. PATENT DOCUMENTS

| | | |
|---|---|---|
| 802,150 | 10/1905 | Nordstrom . |
| 2,092,484 | 7/1937 | Tomlinson . |
| 2,104,683 | 7/1938 | Van Rosen et al. . |
| 2,588,106 | 3/1952 | Frangquist . |
| 2,755,017 | 7/1956 | Kyselka et al. . |
| 3,234,716 | 2/1966 | Sevin et al. . |

(List continued on next page.)

OTHER PUBLICATIONS

*Chemical Engineers's Handbook* —Fifth Ed., pp.17–47, 17–48.
*Int. J. , Heat Mass Transfer* —vol. 37 No. 12, pp. 1773–1781, 1994 "A numerical study of the effect of Corolis force on the fluidflow and heat transfer due to wire heating on centrifuge".
*J. Fluid Mech.* (1989), vol. 203, pp. 541–555 "Flow in a partially filled, rotating, tapered cylinder".
*Journal of Applied Mathematics and Physics (ZAMP)*, vol. 41, pp. 270–283, "Visualization of boundary layers in a sectioned centrifuge".
*J. Fluid Mech.* (1989), vol. 201, pp. 203–221, "Three–dimensional numerical simulation of flows past scoops in a gas centrifuge".
*Journal of Chinese Society of Mechanical Engineers*, vol. 9, No.1, pp. 53–62 (1988), "Supersonic Vortex Centrifuge—A New Device".

*Primary Examiner*—Charles E. Cooley
*Attorney, Agent, or Firm*—John W. Montgomery; Garder & Wynne, L.L.P.

[57] ABSTRACT

A gas separation centrifuge is provided with a housing having a top, a bottom and a plurality of joined side walls parallel to an axis and forming a predetermined regular polygon cross-sectional shape perpendicular to the axis. A rotor is mounted for coaxial rotation within the housing, including a plurality of inverted truncated pyramid plates forming the predetermined regular polygon shape at an outer periphery, and forming the predetermined regular polygon shape at an interior edge. The plurality of inverted truncated pyramid plates are stacked coaxially and are axially spaced apart to form planar channels therebetween and define an interior annular volume with openings therefrom into the planar channels. There are also openings through the outer periphery. A first plurality of stationary concentric input tubes extends into the interior annular volume. Each input tube is connectable to a source of inlet fluid and communicates with the interior annular volume at different distances along the axis terminating close to the bottom of the housing. A second plurality of stationary concentric output tubes also extends into the interior annular volume. Each output tube is connectable to a collection device and communicates with the interior annular volume at different distances along the axis close to the top of the housing. One of the plurality of input tubes is connected to a source of liquid solvent for injecting a quantity sufficient for coating the interior side walls to a thickness less than the minimum clearance distance between the exterior periphery of the rotor plates. A motor is connected for rotating the rotor at a speed sufficient to cause a maximum pressure above about 1,000 psi in the housing at the side walls. Another of the plurality of input tubes is connected to a source of a gaseous mixture. At least one of the outlet tubes has an opening at a position in the interior annular volume for withdrawing one gas of said mixture in a high state of purity.

8 Claims, 3 Drawing Sheets

U.S. PATENT DOCUMENTS

| | | |
|---|---|---|
| 3,643,404 | 2/1972 | Ronning . |
| 4,046,527 | 9/1977 | Kistemaker . |
| 4,092,130 | 5/1978 | Wikdahl . |
| 4,118,207 | 10/1978 | Wilhelm . |
| 4,198,218 | 4/1980 | Erickson . |
| 4,265,643 | 5/1981 | Dawson . |
| 4,265,648 | 5/1981 | Wedege . |
| 4,361,490 | 11/1982 | Saget . |
| 4,531,371 | 7/1985 | Voronin et al. . |
| 4,886,523 | 12/1989 | Maldague . |
| 5,225,174 | 7/1993 | Friesen et al. . |
| 5,305,610 | 4/1994 | Bennet . |
| 5,895,582 | 1/1990 | Bielefeldt . |

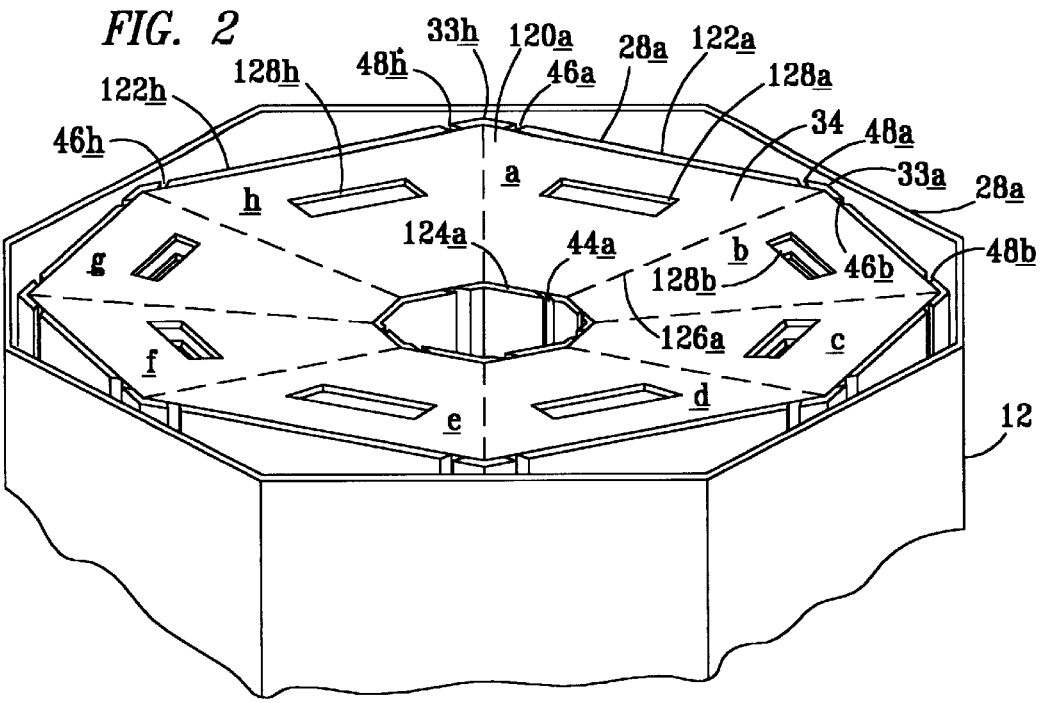
FIG. 2
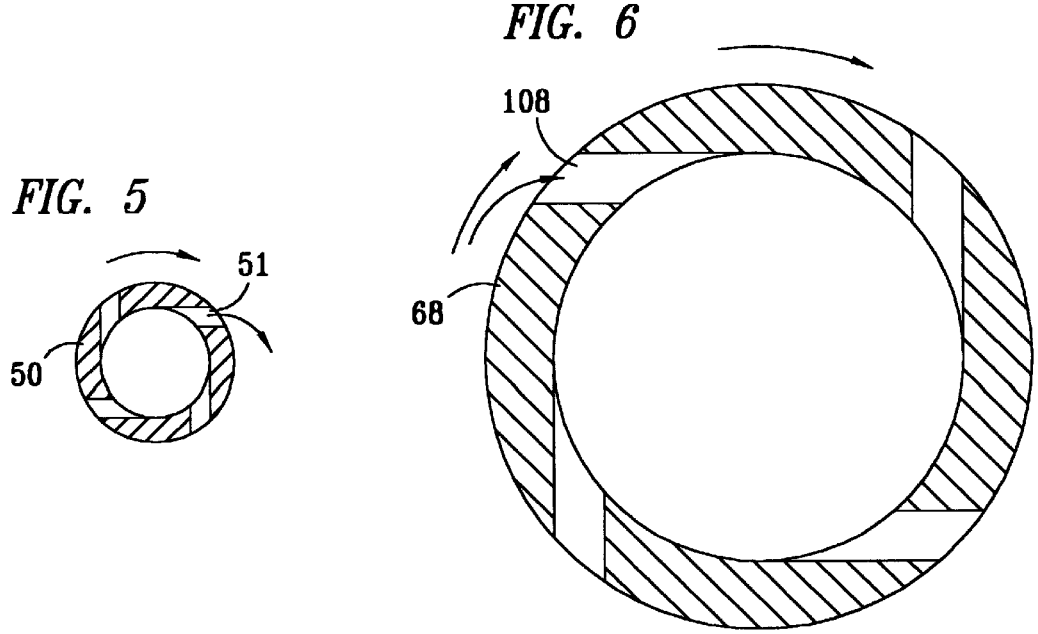
FIG. 5
FIG. 6

MASS-MASS CELL GAS CENTRIFUGE

TECHNICAL FIELD OF THE INVENTION

The present invention relates to a mass-mass cell centrifuge, and in particular to a gas separation centrifuge having a narrow gap centrifugal cell rotor in a device capable of separating individual fractions from a mixed gas inlet.

BACKGROUND OF THE INVENTION

Kinetic theories have predicted that a partial separation of constituents of a gaseous mixture will occur when the mixture is subjected to a pressure gradient. Industrial processes for separating individual fractions of mixtures on the basis of a pressure gradient are not widespread. In order to obtain sufficient separation between components of a gaseous mixture, relatively steep pressure gradients are required. In the past, large pressure gradients could be achieved in a gaseous mixture using a standard gas centrifuge. Other devices utilizing pressure diffusion sometimes include a separation nozzle, particularly for enrichment of isotopes of uranium.

The typical or standard gas centrifuge includes a tall vertical rotary cylinder fed with the gas mixture to be separated. The cylinder is rotated about its axis at a high angular velocity. The rotation of the cylinder causes the gas mixture to increase its angular rotational velocity so that the lighter components of the mixture move toward the axis and the heavier components of the mixture move toward the wall. Under standard conditions, significant high-purity separation is difficult to achieve unless the rotational velocity is extremely high. A plurality of sequentially ganged or cascaded gas centrifuges are often used to obtain significantly pure components.

Countercurrent gas centrifuges rotate a tall vertical cylinder and also induce an axial convective circulation in order to increase the basic separation effect. The countercurrent flow has been provided using external pumps, by providing an axial temperature gradient or by insertion of a stationary member in the rotating cylinder.

A device known as a separation nozzle uses a concept of a pressure gradient induced in a curved expanding supersonic jet to achieve separation of a gas mixture. The power consumption of separation nozzles is significant relative to the separation achieved. In various prior gas separation centrifuge devices, including countercurrent gas centrifuges and expanding jet or separation nozzle centrifuges, many stages cascaded together have often been required in order to obtain the desired separation.

Another device sometimes previously suggested for gas-gas separation includes a vortex tube or a vortex chamber separator in which a fluidic separation process results from centrifugal forces used for separating or precipitating a denser disperse phase from a lighter continuous flowable phase. Vortex chamber separators have the disadvantage of relatively bad separating efficiency relative to the energy requirement, primarily because of high flow resistance in the vortex chamber and also the use of multi-chamber systems with relatively high volume.

Another centrifuge for separating impurities from gas mixtures, especially for separating sulphur compounds ($SO_2$) from flue gases, from oil, or from coal-fired furnaces which contain sulphur compounds ($SO_2$) was disclosed by Wedege in U.S. Pat. No. 4,265,648. A rotor was suggested comprising two separate concentric sets of frustoconical plates with the inlet gas mixture being arranged in the annular space between the two concentric sets. Outlets for the heavy gases were to be at the periphery of the rotatable concentric plate. The $SO_2$ was to be removed from the periphery and thus cleaned. The remaining gas mixture was to be removed at the central axis. Frustoconical impeller plates in a centrifuge have also been suggested for separating dust particles from suspension in gas as in U.S. Pat. No. 3,234,716.

The separation of dust particles or other solids from flue gases and the separation of heavy gaseous components such as $SO_2$ having a density at one atmosphere, which is more than two times as dense as the air or the flue gas in which the impurities are carried, have not provided adequate solutions for gas-gas separation where the relative densities of the components of the gas mixture are only slightly different.

SUMMARY OF THE INVENTION

These and other disadvantages of flue gas cleaning devices, dust particle separators and also of previous gas centrifuge technology have been addressed and the results for obtaining gas separation have been substantially improved in the gas centrifuge separation device of the present invention.

Thus, it is an object of the present invention to provide a narrow gap centrifuge having a stationary housing, a rotor mounted for coaxial rotation within the housing including a plurality of inverted truncated pyramid plates spaced apart to form channels therebetween by which inlet gas mixtures such as natural gas or ambient air may be acted upon for separation and collection of enriched oxygen, nitrogen, carbon dioxide and hydrogen sulphide as purified species.

A further object is to provide a construction and a method of use of internal rotor in a gas centrifuge, which internal rotor comprises a plurality of spaced apart inner and spaced apart outer separation walls creating passages there between and which rotate with the internal rotor. The exterior housing of the centrifuge remains stationary and a working liquid solvent is contained therein. A pressure gradient is thereby produced by rotation of the rotor. Outlet valves are adjusted to maintain a desired back pressure to facilitate light/heavy separation. The light constituents are removed through a hollow central tube around which the internal rotor is rotated. Medium or intermediate weight constituents can be extracted from concentric tubes at locations below the light constituents and closer to the axis. Mixtures of gases having small differences in density can be separated into constituent fractions having high purity.

Yet another object of the invention is the inclusion of "bow shock" opening in the stacked plates of the rotor to facilitate vertical transport and separation of the gas mixture into its component parts. These openings cause entrained intermediate gases to be released from the heavier components of the gases. The openings are aligned to allow the released intermediates to be conducted from opening to opening, through each spaced apart blade of the rotor, from the inlet into the centrifuge to the outlet where the separated gases are collected. These bow shock openings might not be absolutely necessary for successful operation, but they facilitate separating one component from another and, therefore, increase the purity of the extracted heavy constituents and light gas constituents.

It is a further object of the present invention to provide a method of gas separation in a centrifuge with spaced rotary plates, a low pressure central zone, and a high pressure exterior zone having a liquid solvent within the centrifuge and injecting a quantity of a mixture of gas at a low pressure zone in the centrifuge allowing the gas mixture to move outward along the spaced rotary plates and to disassociate into separate zones of high purity components of the mixture within the low pressure central zone and withdrawing quantities of high purity components from the separate zones at predetermined rates to maintain substantially continuous flow of the high purity components.

BRIEF DESCRIPTION OF THE DRAWINGS

The foregoing objects, advantages, and features, as well as other objects and advantages, will become more apparent with reference to the following detailed description of the preferred embodiments, claims, and drawings, in which like numerals represent like elements and in which:

FIG. 2 is a schematic partial perspective cutaway view through the gas centrifuge of FIG. 1, section line 2—2, showing one of the plates of the plurality of spaced apart plates of the rotating rotor of the centrifuge in which the inverted pyramid polygon shape is depicted;

FIG. 5 is a cross-sectional view through an inlet opening into the central annular volume taken along section line 5—5 of FIG. 1; and FIG. 6 is a cross-sectional view through an outlet tube showing outlet scoops through the outlet tube for withdrawing enriched components separated in the centrifuge taken along section line 6—6 of FIG. 1.

DETAILED DESCRIPTION OF THE PREFERRED EMBODIMENTS

Figure 1:
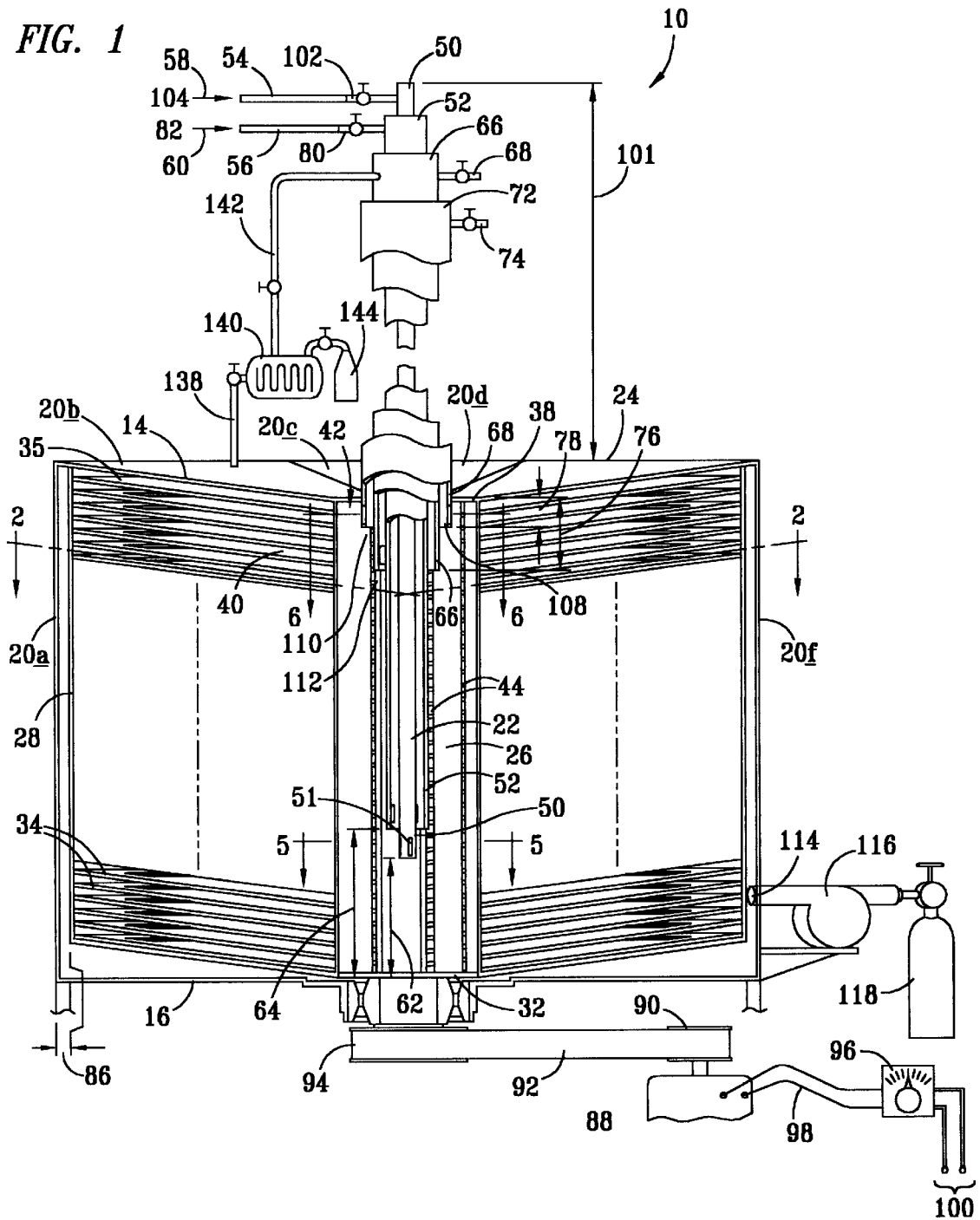
FIG. 1 is a schematic side view in partial cross section of a gas centrifuge, according to the present invention.

FIG. 1 depicts a side partial cross-sectional view of a gas separation centrifuge 10, according to the present invention. In this embodiment, a housing 12 having a top 14, a bottom 16 and a plurality of side walls 20a–h joined together along corners parallel to a central axis 22 and forming a predetermined regular polygon cross-sectional shape 24 perpendicular to the axis 22. A rotatable rotor 30 is mounted in a bearing supported turntable 32 for coaxial rotation within the housing 12. Housing 12 is preferably constructed of steel or another durable material, and is sealed and capable of withstanding internal pressures of about 1,000 psi to about 10,000 psi. In the embodiment depicted, the housing and the rotor are constructed for clockwise rotation of the rotor 30 within a stationary housing 12. Rotor 30 includes a plurality of inverted truncated pyramid plates 34 having a predetermined regular polygon periphery shape which corresponds to the shape 24 of the housing; but, which has dimensions smaller than the housing for rotation inside of housing 12. The regular polygon shape 24 of rotor 30 is defined at the outer periphery 36 with a plurality of end support plates 28 joining the outer periphery edges 36 of a plurality of inverted truncated pyramid plates 34 stacked coaxially and axially spaced apart to form radial channels 40 therebetween. The exterior support plates 28 of the rotor maintain the spacing between the truncated pyramid-shaped rotor plates. Support plates 28 are joined to one another along vertical corners 33. The inverted truncated pyramid plates 34 also define an interior annular volume 42 which volume also has the regular polygon shape 24 with a smaller dimension than the outer periphery. There are interior openings 44 formed through interior support plates 26 for fluid communication between the annular volume 42 and the radial channels 40. Each interior support plate 26 is joined along the vertical corners of the polygon-shaped annular volume. The interior support plates are also joined to the interior edges 38 of each inverted truncated pyramid plate to maintain the spacing therebetween.

Preferably, the inverted truncated pyramid plates 34 define upwardly angled planar radial channels 40. Preferably, the space between the plates is about ⅛ inch (about 5 mm). It has been found that for a rotor 30 having an exterior dimension of approximately 30 inches, each planar radial channel 40 extends about 12 inches and has a rise from the interior opening 44 to the outer periphery edges 36 of about 1 to about 2 inches and, preferably, about 1 ¼ to 1 ½ inch rise. At the outer periphery, through plates 28, exterior openings 46 and 48 are formed in each plate 28. One exterior opening 46 is formed immediately preceding each exterior vertical corner and another exterior opening 48 immediately following each exterior vertical corner.

At least one stationary input tube extends vertically into the interior annular volume 42. In the embodiment depicted, a plurality of two concentric input tubes 50 and 52 are shown. Each concentric input tube 50 and 52 is connectable to a separate source 54 and 56, respectively, of inlet fluid 58 and 60, respectively. The concentric input tubes communicate from the source fluids 58 and 60 to the interior annular volume 42 and each concentric input tube extends a different distance along the axis close to the bottom 16 of the housing 12. In the embodiment depicted, concentric input tube 50 has its end at a distance 62 from bottom 16 and concentric input tube 52 has its end terminating at a distance 64 from the bottom of the housing. In the preferred embodiment the ends of tubes 50 and 52 have angled input openings 51 (as shown in FIG. 5) that are positioned about one-fifth of the way from the bottom to the top such that tubes 50 and 52 extend approximately four-fifths of the total distance from the top 14 to the bottom 16. In an embodiment which is approximately 21 inches tall, distance 62 is approximately 3–4 inches and distance 64 is approximately 4–5 inches from bottom 16 to the tubes 50 and 52.

At least one outlet tube extends into the interior annular volume for extracting a separated gas fraction. In the preferred embodiment depicted, a plurality of stationary concentric outlet tubes 66 and 68 extend into the interior annular volume 42 to different distances 76 and 78, respectively, along the axis 22 close to the top 14 of housing 12. Each output tube is connectable to a collection devices 72 and 74, respectively, and are preferably positioned within the annular volume to a predetermined vertical distance from the top 14 and a predetermined radial distance from the axis 22. The vertical distance is set at a predetermined distance by welding the tubes 72 and 74 to the top 14 of housing 12. The radial distance is also predetermined by selecting the diameters of the collection tubes 72 and 74. The inlet positions are selected so that the inlet openings correspond to a zone of high purity gas, as will be explained more fully below.

One tube 52 of the plurality of concentric input tubes is connected to a source 80 of a solvent, preferably a liquid, for injecting a quantity of the liquid solvent into the sealed housing 12 sufficient for coating the interior side walls 20a–h to a thickness less than the minimum clearance distance 86 between the exterior periphery of the rotor blades and the interior side walls 20a–h. This minimum distance 86 occurs when the corners 33 of the rotor 30 are moved past the middle of each side wall 20. In one preferred embodiment, it has been found that a minimum clearance distance of about 10 mm (approximately ¼ inch) provides for successful gas separation in an operating centrifuge, according to the present invention.

A motor 88 is connected for rotating the rotor 30 at a speed sufficient, with a working liquid solvent injected into the housing, to cause a pressure at the walls 20 above about 1,000 psi inside the housing 12. The maximum pressure within the housing 12 occurs at the side walls 20. The pressure is dependent upon the weight of the solvent, the volume of fluid being rotated and the rotational speed of the motor. Preferably, the motor is connected through a motor pulley 90, a drive belt 92 and a rotor cable pulley 94. A gear belt system has been used successfully. Other transmission mechanisms could be used, provided a smooth rotational force is imparted. Also preferably, motor 88 is provided with a variable speed control 96 so that input power 100 can be adjustably supplied to the motor through lines 98. An inverter controller such as that manufactured by Leeson has been used successfully for speed control 96.

Another tube 50 of the plurality of input tubes is connected to a source 102 of a gaseous mixture 104 which is to be separated. The gaseous mixture is preferably drawn into the centrifuge when the rotor is at an operational speed at pressure approximating atmospheric pressure or from a positive pressure about 1 psi above atmospheric pressure. After initiating injection of air, a column 101 of about 4 feet will act to maintain flow of air from atmospheric pressure. This results in a significant pressure differential from the inside of the annular volume 42 where the gaseous mixture 104 is supplied through input tube 50 and the exterior periphery of the rotor at which at the liquid solvent is forced against walls 20a–h.

The centrifugal force on the working liquid solvent causes a significant pressure differential from the interior annular volume 42 to the walls 20a–h. The rotation of the rotor also results in a temperature differential between the interior annular volume and the exterior of rotor 30. During operation, it has been found that with temperatures in the range of 50° F. to 60° F. at the annular volume 42, and temperatures in the range of 120° F. to 200° F. occur at the periphery wall 20.

At least one of the concentric outlet tubes 66 or 68 will have an opening 106 or 108 at a position spaced along the axis a distance 76 or 78 and at an axial diameter of the outlet tube 66 or the outlet tube 68 such that it will be in a zone for collection of a separated enriched gas component from the gaseous mixture 104. In the embodiment depicted, outlet tube 66 has its outlet opening 106 at a position for withdrawing one enriched gas 110 and outlet 68 has its outlet opening 108 positioned a distance 78 from the top of the housing and at a forward angle as shown in FIG. 6, for collecting another enriched gas 112 separated from mixture 104.

In the embodiment depicted and in one preferred embodiment according to the present invention where enriched oxygen is to be separated from air, the liquid solvent includes water. By way of example, it has been found that a quantity of approximately 8–9 gallons injected into a housing 12 with the rotor 30 having dimensions of approximately 30-inch diameter, 21-inch height, about 48 spaced apart plates, and which is in the form of a regular octagon-shaped inverted pyramid is an adequate quantity of solvent liquid. The source gas mixture from which oxygen is to be separated is air, and it will initially be input into the centrifuge at a slight positive pressure above atmosphere. The gas 110 withdrawn through outlet tube 66 will be enriched oxygen. Nitrogen will also be separated into another zone for collection through outlet tube 68. Uniquely and unobviously, it has also been found that by modifying the liquid solvent, in this case by injecting carbon dioxide in a gaseous stream through the liquid water within the sealed housing 12, additional gas separation is facilitated and oxygen having a purity of above 90% and as high as between about 95% and 99.2% $O_2$ can be achieved with a single rotor. In the example of oxygen ($O_2$) recovery at purities above about 95%, the rotary speed of the rotor 30 is adjusted to provide a pressure at the side walls of between about 2,300 psi and 5,000 psi and the temperature deferential is about 100° F. For example, the interior annular volume may be at a temperature of about 50°–70° F. and the temperature at the exterior volume at approximately 130°–190° F.

In operation, a quantity of water is injected from source 82 through a valve 80 and down through conduit 52 into the annular volume 42. The rotor 30 is adjustably increased in speed using a speed control 96 until the water is centrifuged to the exterior surface and substantially clears the rotor blades forming a layer 130 up along the interior walls 20. The use of the water both facilitates the generation of a pressure differential and also acts as a solvent for the separation process. $CO_2$ is injected tangentially to the rotation of the rotor 30 and solvent 130 through a tangentially angled side opening 114 using a blower 116 which receives $CO_2$ at about 5 psi from a regulated supply bottle 1 18. The $CO_2$ is blown and/or drawn through the rotating water. Although the pressure of the water is significantly higher than the initial $CO_2$ pressure, the tangentially angled inlet 114 and the clockwise rotation of the rotor 30 and solvent layer 130 allows the $CO_2$ to be drawn into and dissolved in the water forming a liquid solvent including water and carbonic acid.

Figures 3, 4:
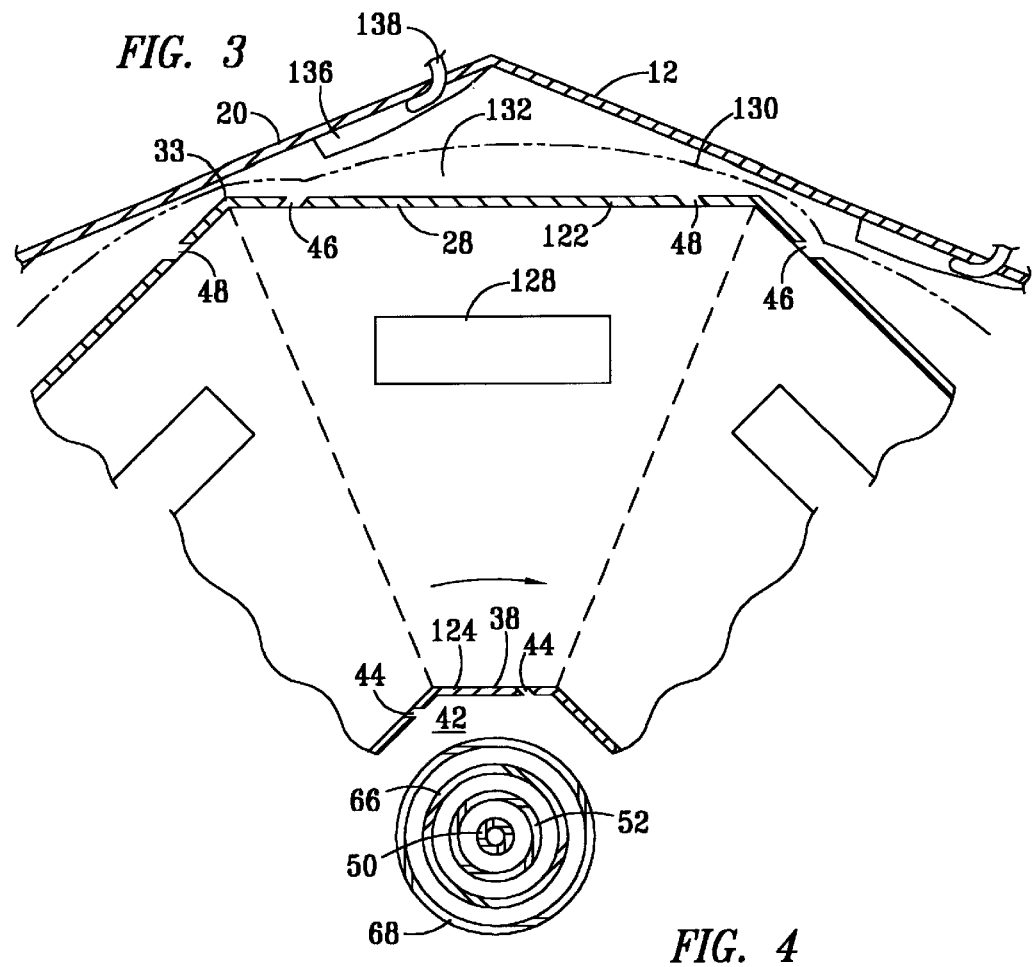
FIG. 3 is a top plan view with partial cutaway section depicting additional details of a corner of the housing and the rotor blade operating within the polygon-shaped housing, according to one preferred embodiment of the present invention.
FIG. 4 is a schematic side view showing certain predicted flow patterns within the centrifuge, according to one embodiment of the present invention.

FIG. 2 is a schematic partial perspective view of one centrally located rotor plate 34 mounted within polygon-shaped housing 12, essentially looking at the device along a section line 2—2 of FIG. 1. The plate 34, as depicted in FIG. 2, is not the top-most plate of rotor 30 but is a truncated pyramid polygon plate typical of all of the plates except the top-most plate 35 or the cap plate 35 which differs as described below. Plate 34 is formed with a plurality of flat plates. In the case of a regular octagon shape, eight flat segment plates 120, each of which has an exterior edge 122 and an interior edge 124 are secured together with exterior vertical support plates 28a–h. Each is welded to an adjacent flat plate 120 along a seam 126. Further, each plate 120a–h has a midplate opening 128a–h formed therein. The openings 128a–h are at the same radial distance from the central axis and at the same position through segment plates 120a–h. The construction of the inlet openings 44 into the channels 40 formed between the plates 34 may also be more fully understood with reference to both FIGS. 2 3. FIG. 3 is a partial cutaway top plan view of one segment 120awhich is used to form inverted truncated pyramid plate 34. The inlet openings 44 are at an angle and are positioned for effective scooping of the gas into channel 40. Also more fully understood with reference to FIGS. 2 and 3 together are the outlet openings 46 and 48 in which opening 46 is at an angle for scooping the centrifuge fluid mixture and opening 48 is at a back angle for drawing fluid out of channel 40 between plates 34.

As indicated above, the top plate 35 of FIG. 1 is in substantially the same shape and configuration as that of plates 34, except that no mid-plate opening 128 is formed in the top plate 35. It is theorized that openings 128 create a bow shock within fluid passing from opening 44 through channel 40 and exiting out openings 48. The bow shock phenomenon facilitates circulation and separation of one component of the gas from another component of the gas. Theoretically, with the midplate opening 128 moving clockwise as indicated, the bow shock phenomenon will produce a vertical component of circulation through all the aligned openings 128*a–h* of all of the plates of the inverted truncated pyramid-shaped plates 34.

Theoretically, other physical and/or chemical mechanisms result, in the construction according to the present invention, which facilitate separation of a gaseous fluid into enriched components. It is believed that the separation achieved results from certain phenomenon associated with the formation of a solvent layer 130 which is schematically depicted as a phantom line in FIG. 3. The precise shape and configuration of layer 130 under different operating conditions of the centrifuge, according to the present invention, continues to be under investigation. In any event, a mixture of gaseous fluid 104 and evaporated or separated components of solvent layer 130 will result in a conglomeration or multiphase mixture of combined and separate components in an area 132 in the periphery annular space between rotor 30 and housing 12. It is believed that this fluid mixture also undergoes additional separating phenomenon through chemical interaction with the solvent layer 130. Further, the unique polygon-shaped rotor and housing also facilitates both separation and transport of enriched components through the acceleration, frictional movement, nozzle effect and bow shock resulting as corners 33 of rotor 30 rotate past the solvent layer 130. Particularly, the solvent layer 130, the side wall 28, and the corner 33 create a nozzle or venturi which facilitates kinetic separation of constituent gases each time a corner 33 moves past a side wall 28. Further, because of the upward incline of the rotor plates 34, an upward component of acceleration motion is provided to the fluid to be separated 104 such that the resultant separated gases are transported and move, generally, in various paths and recirculate as schematically depicted in FIG. 4. Ultimately, the lightest or lowest mass constituents of the gaseous mixture preferably collect in a zone toward the top of the central annular volume 42 at a distance from the axis, and heavier components are collected in a zone in the annular space 42 which is further from the top and which is closer to the central axis.

Additional aspects of the present invention include the ability to collect additional heavier components and to form useful chemicals therefrom. For example, aqueous ammonia can be formed in the example depicted in which the gas to be separated is to be air and the solvent is water having dissolved carbon dioxide, thereby forming a portion thereof into carbonic acid, a portion of the solvent at exterior wall 28 may be scooped from the surface as with a scoop 136. Scoop 136 is positioned in a high pressure area of the solvent and a portion of the solvent is carried as through a conduit 138 and is passed through a catalytic chamber 140. The catalytic chamber is constructed of a porous mixture of palladium, iron and alumina into which the nitrogen is supplied from the recovery conduit 66 as through a conduit 142. This process uses a known process (the Haber Process) for forming ammonia dissolved in liquid. This product is collectable into a container 144. Thus, according to this invention, some of the chemical equilibrium conditions which are theorized to be occurring may be in the Table I as indicated below:

TABLE I

Ambient 15 psig
N—78
O—20.95
$CO_2$—.03
AR—.93

| | | |
|---|---|---|
| Annular $H_2O \rightarrow$ | $\downarrow\downarrow$ | $\leftarrow CO_2$ Tangent |
| | $\downarrow$ | |
| $CO_2 + H_2O$ | $\leftrightarrows$ | $H_2CO_3$ @ ≈ 2,300 ⇆ 5,000 psi |
| | | @ ≈60 ⇆ 190° F. |
| $H_2CO_3$ | $\leftrightarrows$ | $H^+ + HCO_3$ |
| $HCO_3$ | $\leftrightarrows$ | $CO_3^{-2} + H^+$ |
| | $\downarrow\downarrow$ | |
| | Heat | -Periphery |
| | $\downarrow\downarrow$ | |
| | Expansion | -Cool Annular |
| | $\downarrow\downarrow$ | |
| | O | |
| $N + H_2O$ | $\rightarrow$ | Solution Available |
| $H_2CO_3 + N$ | $\rightarrow$ | Solution Available |
| Against 2N/Divided Fe/X Alumina | | |
| $\downarrow\downarrow$ | | |
| $NH_3$ Dissolved Aqueous | | |

What is claimed is:

1. A gas separation centrifuge comprising:
    a) a housing having a top, a bottom and a plurality of joined side walls parallel to an axis and forming a predetermined regular polygon cross-sectional shape perpendicular to said axis;
    b) a rotor mounted for coaxial rotation within said housing, including a plurality of inverted truncated pyramid plates forming said predetermined regular polygon shape at an outer periphery and forming said predetermined regular polygon shape at an interior edge, said plurality of inverted truncated pyramid plates stacked coaxially and axially spaced apart to form planar channels therebetween and an interior annular volume with interior openings therefrom into said planar channels and exterior openings through said outer periphery;
    c) a first plurality of stationary concentric input tubes extending into said interior annular volume, each input tube connectable to a source of inlet fluid and communicating with said interior annular volume at different distances along said axis toward said bottom of said housing;
    d) a second plurality of stationary concentric output tubes extending into said interior annular volume, each output tube connectable to a collection device and communicating with said interior annular volume at different distances along said axis toward said top of said housing;
    e) one of said plurality of input tubes connected to a source of liquid solvent for injecting a quantity sufficient for coating the interior of said side walls to a thickness less than the minimum clearance distance between said interior of said side walls and said outer periphery of said plurality of truncated pyramid plates of said rotor;
    f) a motor connected for rotating the rotor at a speed sufficient to cause a maximum pressure above about 1,000 psi in the housing at the side walls;
    g) another of said plural plurality of input tubes connected to a source of a gaseous mixture; and
    h) at least one of said output tubes having an outlet opening at a position in said interior annular volume for withdrawing one gas of said mixture in a high state of purity.

2. A gas separation centrifuge as in claim 1 wherein said predetermined regular polygon cross-sectional shape of said housing is a regular octagon and said plurality of inverted truncated pyramid plates stacked to form said rotor are octagonally-shaped inverted truncated plates.

3. A gas separation centrifuge as in claim 1 wherein one of said plurality of input tubes connected to a source of liquid solvent is connected to a source of water.

4. A gas separation centrifuge as in claim 3 further comprising a tangential injection opening for injecting a quantity of carbon dioxide into said housing at one of said joined side walls thereof for dissolving in said water.

5. A gas separation centrifuge as in claim 1 wherein said rotor mounted for coaxial rotation within said housing further comprises said axially spaced apart plates spaced at a distance of about 5 mm.

6. A gas separation centrifuge as in claim 1 further comprising:
   a) said interior openings formed from said interior annular volume into said planar channels, said interior openings being disposed at an angle for scooping in the direction of rotation of said rotor;
   b) vertical plates attached at the periphery of said inverted truncated pyramid plates conjoined to form said octagonally-shaped cross section for said rotor and including a forward opening ahead of each corner in the direction of rotation angled for scooping fluid into said channels between said truncated pyramid plates, and one of said exterior openings angled rearward from the direction of rotation to avoid scooping in the direction of rotation for drawing fluid from between said channels of said pyramid plates into an exterior annular volume between said periphery of said plates and said joined side walls of said housing; and
   c) said joined peripheries of said plates of said rotor sized and constructed for creating a minimum clearance distance between said peripheries and said parallel side walls of said housing of about 10 mm.

7. A gas separation centrifuge as in claim 1 wherein:
   a) said first plurality of stationary concentric input tubes includes angled input opening channels at one end thereof inserted into the interior annular volume, said angled input opening channels angled rearward to avoid scooping and thereby to facilitate drawing inlet fluid into said annular volume upon rotation of said rotor; and
   b) said second plurality of stationary concentric output tubes have outlet opening channels formed at a forward angle into said second plurality of stationary concentric output tubes for providing scooping of collected gas from said interior volume upon rotation of said rotor.

8. A gas separation centrifuge as in claim 1 wherein said rotor mounted for coaxial rotation within said housing further includes a plurality of midplate openings formed in said plurality of inverted truncated pyramid plates, said openings vertically aligned and positioned intermediate between the interior annular volume and the outer periphery extending from the bottom-most plate of said rotor to a cap plate immediately adjacent the top of the housing, the cap plate having a solid surface without intermediate midplate openings formed therein.

* * * * *